US011554923B2

(12) United States Patent
Christen

(10) Patent No.: US 11,554,923 B2
(45) Date of Patent: Jan. 17, 2023

(54) TELESCOPIC CONVEYOR WITH INTEGRATED INDEXING AND MEASURING CONVEYING MEANS

(71) Applicant: Hansueli Christen, Zeihen (CH)

(72) Inventor: Hansueli Christen, Zeihen (CH)

( * ) Notice: Subject to any disclaimer, the term of this patent is extended or adjusted under 35 U.S.C. 154(b) by 12 days.

(21) Appl. No.: 17/295,992

(22) PCT Filed: Nov. 14, 2019

(86) PCT No.: PCT/IB2019/059781
§ 371 (c)(1),
(2) Date: May 21, 2021

(87) PCT Pub. No.: WO2020/104902
PCT Pub. Date: May 28, 2020

(65) Prior Publication Data
US 2022/0033193 A1    Feb. 3, 2022

(30) Foreign Application Priority Data

Nov. 21, 2018 (DE) .......................... 102018009134.2

(51) Int. Cl.
*B65G 47/31* (2006.01)
*B65G 21/14* (2006.01)
(Continued)

(52) U.S. Cl.
CPC ............. *B65G 47/31* (2013.01); *B65G 21/14* (2013.01); *B65G 41/001* (2013.01); *B65G 67/02* (2013.01); *B65G 2203/0208* (2013.01)

(58) Field of Classification Search
CPC ...... B65G 47/31; B65G 21/14; B65G 41/001; B65G 67/02; B65G 2203/0208; B65G 21/10
See application file for complete search history.

(56) References Cited

U.S. PATENT DOCUMENTS 5,796,052 A * 8/1998 Christmann ........... B65G 21/14
177/121
6,481,563 B1 * 11/2002 Gilmore ................. B65G 67/08
198/588

(Continued)

FOREIGN PATENT DOCUMENTS

CN        207876634 U     9/2018
DE         4223716 A1     1/1994
(Continued)

Primary Examiner — Mark A Deuble
(74) Attorney, Agent, or Firm — Hudak, Shunk & Farine Co., LPA

(57) ABSTRACT

Telescopic conveyor with integrated indexing and measuring conveyor is described, the telescopic conveyor having a frame, at least one telescopic segment mounted so as to be extendable with respect to the frame and a transport conveyor, the transport conveyor is driven at a first conveying speed ($v_1$) and is supported on the at least one telescopic segment and on the frame and wherein the indexing and measuring conveyor is arranged on a delivery side of the transport conveyor. The telescopic conveyor enables the packet items located thereon to be automatically separated while taking up as little space as possible. The indexing and measuring conveyor is mounted on the same frame and is driven at a second conveying speed ($v_2$), the second conveying speed ($v_2$) being greater than the first conveying speed ($v_1$).

19 Claims, 1 Drawing Sheet

(51) Int. Cl.
  *B65G 41/00* (2006.01)
  *B65G 67/02* (2006.01)

(56) References Cited

U.S. PATENT DOCUMENTS

| | | | |
|---|---|---|---|
| 6,823,985 B2* | 11/2004 | Gilmore | B65G 21/14 198/588 |
| 7,108,125 B2* | 9/2006 | Gilmore | B82Y 5/00 198/313 |
| 7,909,153 B2* | 3/2011 | Pogue | B65G 67/08 198/315 |
| 8,622,199 B2* | 1/2014 | Windfeld | B65G 47/71 198/588 |
| 8,662,291 B2* | 3/2014 | Henderson | B65G 21/14 198/588 |
| 9,950,868 B1* | 4/2018 | Baek | B65G 21/14 |

FOREIGN PATENT DOCUMENTS

| | | |
|---|---|---|
| DE | 4419113 C1 | 1/1996 |
| DE | 10255843 A1 | 6/2004 |
| DE | 102010005267 A1 | 7/2011 |
| DE | 202014010334 U1 | 6/2015 |
| DE | 102014103202 A1 | 9/2015 |
| EP | 0658499 A1 | 6/1995 |
| JP | 457708 A | 2/1992 |

* cited by examiner

TELESCOPIC CONVEYOR WITH INTEGRATED INDEXING AND MEASURING CONVEYING MEANS

FIELD OF THE INVENTION

The invention relates to a telescopic conveyor with an integrated indexing and measuring conveyor means, the telescopic conveyor having a frame, at least one telescopic segment mounted so as to be extendable with respect to the frame and a transport conveyor, the transport conveyor is driven at a first conveying speed ($v_1$) and is supported on the at least one telescopic segment and on the frame and wherein the indexing and measuring conveyor means is arranged on a delivery side of the transport conveyor.

BACKGROUND OF THE INVENTION

Telescopic conveyors are used to load or unload transport devices such as trucks, containers, swap bodies or semi-trailers. For this purpose, the telescopic conveyors have a frame with telescopic segments movably guided thereon, which are arranged telescopically, that is to say can be moved into one another or apart. When unloading the transport device, the telescopic segments can usually be telescoped so far that they reach into the transport device and the packet items to be unloaded can be manually loaded onto the telescopic conveyor. The telescopic conveyors are usually equipped with a transport conveyor in the form of a belt system, which adapts to the respective extension length of the telescopic segment(s) and continuously conveys packet items during the unloading process. The term packet is understood to mean piece goods units of different dimensions and external properties, such as parcels or small parcels.

A telescopic conveyor with three telescopic segments is disclosed in DE 102014103202A1, for example. In a parking position, the telescopic conveyor is pushed together and placed under a roller conveyor to save space. To reach an operating position, the frame referred to as the support frame can first be moved forward under a roller table and then the telescopic segments of the telescopic conveyor can be moved out in the direction of a transport device to be loaded.

Both the frame and the telescopic segments are guided in guide elements and thus arranged to be movable. Incoming packets are taken down by the operating staff and placed in a roll container. However, such manual registration and distribution of the packet items has proven to be too slow and inefficient. In addition, the manual registration and distribution of the packets by operating personnel takes up a lot of space, which is usually not available in logistics centers and also negates the advantage of the telescopic conveyor taking up the smallest possible space.

Another prior art is described in DE 10255843 A1 with a telescopic conveyor which has a traveling head with its own drive device at its front end. The front end moves into the transport device for unloading or loading by means of the traveling head, whereby the telescopic segments are pulled apart according to the travel path. The driving head is used to move the telescopic conveyor in and out as well as to attach optionally connected additional devices such as handling robots or unloading belts and move them spatially. In this known telescopic conveyor, the registration and distribution of the packet items after leaving the telescopic conveyor are not clarified, especially if several packet items are closely spaced and individual packet items are not recognized by an automated detection system and are therefore not automatically transported on.

Consequently, the object of the invention was providing a telescopic conveyor which enables the packet items located thereon to be automatically separated while taking up as little space as possible.

SUMMARY OF THE INVENTION

The object is achieved according to the invention with a telescopic conveyor with integrated indexing and measuring conveyor means, the telescopic conveyor comprising a frame, at least one telescopic segment mounted so as to be extendable with respect to the frame and a transport conveyor, the transport conveyor is driven at a first conveying speed ($v_1$) and is supported on the at least one telescopic segment and on the frame and wherein the indexing and measuring conveyor means is arranged on a delivery side of the transport conveyor wherein the indexing and measuring conveyor means is mounted on the same frame and is driven at a second conveying speed ($v_2$), the second conveying speed ($v_2$) being greater than the first conveying speed ($v_1$). The telescopic conveyor is used in particular to unload a transport device and to prepare the packet items lying on the transport conveyor for onward transport.

The indexing and measuring conveyor means integrated in the telescopic conveyor generates a distance in the conveying direction between adjacent packets due to its second conveying speed, which is higher than the first conveying speed of the transport conveyor. This distance is required in order to be able to carry out an automated length measurement of each individual packet. In the case of overlapping packets, length measurement would only be possible with great effort, since overlapping packets could easily be interpreted as a single packet by an automated detection system. In addition, it is also necessary to create a spacing between the packets in order to be able to feed them individually to a sorter, for example, Otherwise, there would be a risk that several packets would inadvertently be detected by the sorter at the same time and that an error would arise in the distribution of these packets.

A major advantage of the telescopic conveyor according to the invention is that the distance is established at a constant first conveying speed of the transport conveyor and the placing of further packets on the transport conveyor is not delayed or the first conveying speed of the transport conveyor has to be slowed down or stopped. Due to the higher, second conveying speed of the indexing and measuring conveyor means, gaps arise between the packets or existing gaps are enlarged.

According to the invention, the indexing and measuring conveyor means and the transport conveyor are attached to a common frame. The frame thus serves to accommodate one or more of the telescopic segments, the transport conveyor running over the frame and the telescopic segment(s) and the complete indexing and measuring conveyor means.

Due to the integration of the indexing and measuring conveyor means in the frame of the telescopic conveyor, particularly compact dimensions can be achieved, so that the telescopic conveyor with the indexing and measuring conveyor means installed in it can be integrated particularly well into existing systems that were originally without an indexing and measuring conveyor means, but rather were operated with a registration and distribution of the packets by operating personnel even if there is no free installation space for an external indexing and measuring conveyor means around.

According to a particular embodiment, it can be provided that the indexing and measuring conveyor means is having a length of 1.20 m to 2.40 m, particularly preferably 1.40 m to 2.20 m, very particularly preferably 1.60 m to 2.00 m. This length has proven to be particularly favorable in order to be able to achieve a slip-free resting of the packets on the indexing and measuring conveyor means and an acceleration to the second conveying speed resulting therefrom.

The first conveying speed of the transport conveyor is preferably 0.6 m/s to 0.8 m/s and the second conveying speed of the indexing and measuring conveyor means is selected to be between 0.2 m/s and 0.4 m/s faster than the first conveying speed. This difference between the first and second conveying speed is sufficient to be able to produce the desired spacing between adjacent packets in the conveying direction.

The transport conveyor and/or the indexing and measuring conveyor means is advantageously a belt (conveyor) system. According to an alternative embodiment, the transport conveyor can also be a driven roller conveyor. A driven roller conveyor usually has several support rollers arranged transversely to the conveying direction, all or some of which are set in rotation by means of motorized drive device(s) and accelerate a packet sliding over it in the conveying direction.

The belt (conveyor) system expediently has a circumferential transport or conveyor belt. This can rest on support rollers or slideways and at the same time serve as a support and traction means.

It has been found to be particularly favorable if the circulating transport belt of the transport conveyor is guided at least in sections under the indexing and measuring conveyor means. In this embodiment, the transport conveyor and the indexing and measuring conveyor means partially overlap in the conveying direction, whereby a particularly compact design is achieved within the common frame, since components of the transport conveyor are placed in an otherwise free space within the frame so that there is a maximum travel distance for the at least one telescopic segment available. This feature results in a further reduction in the space required for the telescopic conveyor when the at least one telescopic segment is in the retracted position.

The circumferential conveyor belt of the transport conveyor is advantageously driven by a drive station arranged under the indexing and measuring conveyor means. The drive station represents a component of the transport conveyor which is particularly suitable for being relocated to the area under the indexing and measuring conveyor means. The conveyor belt is also guided by pulleys to the drive station and runs in this section within the frame.

The drive station can have a motor and/or a power transmission means and/or a drive roller. The motor is typically an electric motor, in particular a direct current motor, which enables simple control and compact dimensions. The conveyor belt should be placed on the drive roller with an angle of contact of at least 120° and be driven with a friction fit connection at the set first conveying speed.

According to a particularly useful embodiment, the indexing and measuring conveyor means can have a loading side and an unloading side, wherein the loading side is adjoining the delivery side of the transport conveyor and the already isolated packet is leaving the telescopic conveyor in the conveying direction on the unloading side. The delivery side of the transport conveyor and the loading side of the indexing and measuring conveyor means can face each other with their ends, which is the case in particular with a transport conveyor and indexing and measuring conveyor means arranged in alignment with one another in the frame.

The delivery side of the transport conveyor is expediently arranged on the same vertical level as the loading side of the indexing and measuring conveyor means. This avoids a ballistic trajectory of the packets transferred from the transport conveyor to the indexing and measuring conveyor means and, if possible, there is already a frictional connection between the packet and the indexing and measuring conveyor means in the area of the loading side, so that the packet overflowing from the delivery side to the loading side is accelerated to the second conveying speed at an early stage and therefore a correspondingly large distance from the subsequent packet that is still on the transport conveyor is established.

The delivery side of the transport conveyor can preferably be adjusted vertically with respect to the frame by means of a height adjustment device. The height adjustment device can have a wedge which rises in the direction of the delivery side, wherein the transport belt runs over the wedge.

It is also possible that a charging side of the transport conveyor can be adjusted in height via a lifting device.

The lifting device can, for example, be arranged on the frame in such a way that it can be raised or lowered on one side on the charging side. With the help of the lifting device, the vertical height of the charging side of the transport conveyor can be brought to an ergonomically favorable level, so that the operating personnel can place items on the transport conveyor without fatigue.

A sensor for detecting a packet located on the indexing and measuring conveyor means is advantageously arranged above the indexing and measuring conveyor means. The sensor is expediently attached to the unloading side of the indexing and measuring conveyor means, since the packet to be detected by the sensor is already accelerated to the second conveying speed in this area and the maximum achievable distance to the following item is established. The sensor should be arranged above the indexing and measuring conveyor means and its measuring lobe should extend over the indexing and measuring conveyor means.

BRIEF DESCRIPTION OF THE DRAWINGS

For a better understanding, the invention is explained below with reference to two figures showing in FIG. 1: a longitudinal section through a telescopic conveyor according to a first embodiment

DETAILED DESCRIPTION OF THE INVENTION

Figure 1:
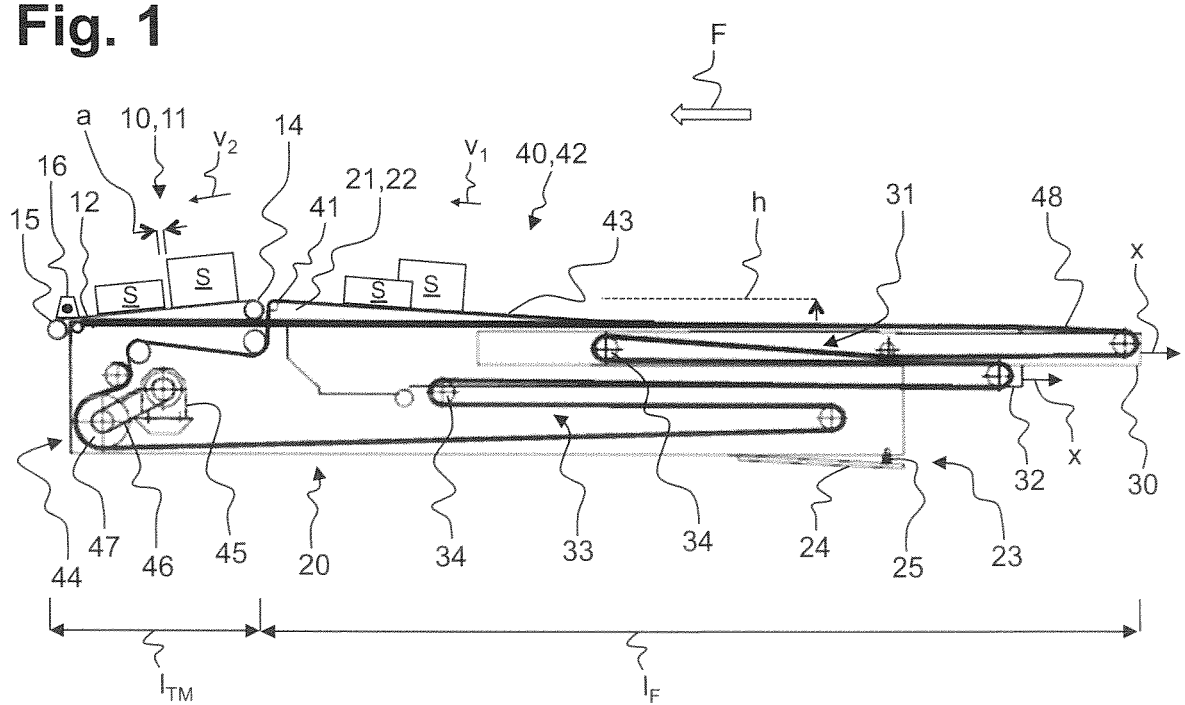

In FIG. 1, a first embodiment of the telescopic conveyor is shown. The transport conveyor 40 as well as the indexing and measuring conveyor means 10 are designed as a belt system 42, 11 respectively.

The telescopic conveyor comprises a frame 20 that stands stationary on the floor and on which a first and second telescopic segment 30, 32 are linearly guided independently of one another in a traversing direction x with respect to the frame 20. The first and second telescopic segments 30, 32 are supported exclusively on the frame 20. In principle, it would also be possible to provide only a single telescopic segment 30 or even more, in particular up to five telescopic segments 32.

Figure 2:
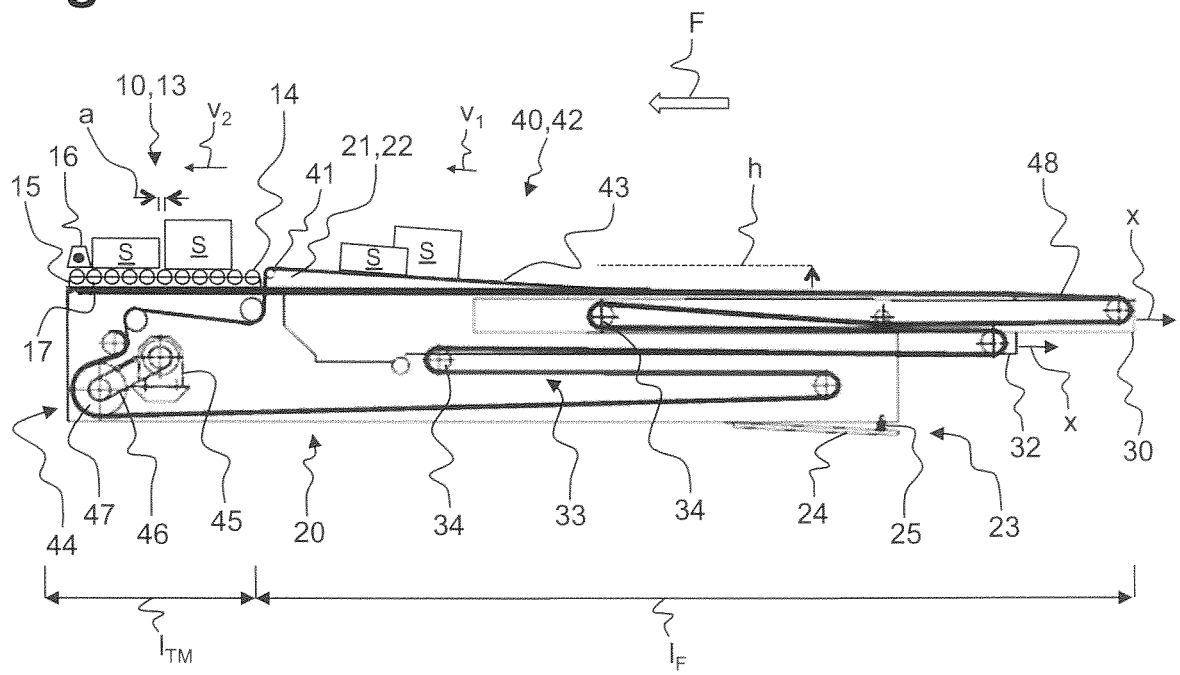
FIG. 2: a longitudinal section through a telescopic conveyor according to a second embodiment.

In the illustration of FIGS. 1 and 2, the first telescopic segment 30 has partially moved out of the frame 20, The second telescopic segment 32 is in a position retracted into the frame 20. The traversing direction x of both telescopic segments 30, 32 is aligned parallel to one another and parallel to the ground. Depending on the extended position of the telescopic segment(s) 30, 32 with respect to the frame 20, a charging side 48 for packets S to be loaded moves towards or away from the frame 20, i.e. to the right or left in the image plane of FIGS. 1 and 2. The charging side 48 is always arranged on the first telescopic segment 30. As a result, the telescopic conveyor can be driven into transport devices such as containers or swap bodies, so that the packets S to be unloaded can be placed on the charging side 48 without the operator having to walk around.

The transport conveyor 40 runs over the stationary frame 20 and over the first and second telescopic segments 30, 32. The belt system 42 used as the transport conveyor 40 has for this purpose a transport belt 43 which is designed as an endless belt. The transport belt 43 is guided on the upper side of the first telescopic segment 30 and the frame 20 as far as a delivery side 41 and dips there to a drive station 44 arranged in the frame 20. The drive station 44 comprises a usually electrically driven motor 45 which sets a drive roller 47 in a rotary motion via a power transmission means 46 such as a drive belt. The transport belt 43 is guided from the drive station 44 within the frame 20 to the end facing away from the drive station 44.

At the distal end of the first telescopic segment 30, the transport belt 43 is deflected by 180° and runs within the first telescopic segment 30 to a tensioner pulley 34 arranged at its proximal end, which is fixedly mounted on the first telescopic segment 30 and displaceable in the traversing direction x with respect to the frame 20. The tensioner pulley 34 of the first telescopic segment 30 and the section of the transport belt 43 running over it constitute a first belt loop 31.

From the first belt loop 31 of the first telescopic segment 30, the transport belt 43 runs over the distal end of the second telescopic segment 32 and from there to a further tensioner pulley 34, which is fixedly mounted on the proximal end of the second telescopic segment 32 and displaceable with respect to the frame 20 in the traversing direction x. The tensioner pulley 34 of the second telescopic segment 32 and the section of the transport belt 43 running over it constitute a second belt loop 33. With the aid of the first and second belt loops 31, 33, the first and second telescopic segments 30, 32 can be moved with respect to the frame 20 independently of the pretensioning of the transport belt 43, resulting in minimized slippage of the transport belt 43 on the drive roller 47.

The vertical height of the charging side 48 can be adjusted by means of a lifting device 23, the lifting device 23 having a pedestal 24 which is stationary on the floor and which is supported with respect to the frame 20 by means of an actuator 25. The actuator 25 can for example comprise a hydraulic cylinder or a spindle. For reasons of stability, the pedestal 24 can be designed as a swing arm and can be attached to the frame 20 with one end section so that it can rotate.

In addition to the transport conveyor 40, the indexing and measuring conveyor means 10 is also integrated into the frame 20. The transport conveyor 40 has a length $l_F$ which can be used for the transport of packets S and which, regardless of the extended state of the telescopic segments 30, 32, is at least three times the length $l_{TM}$ of the indexing and measuring conveyor means 10. The transport conveyor 40 runs at a first conveying speed $v_1$ and transports packets S loaded on the charging side 48 in the direction of conveyance F to the indexing and measuring conveyor means 10. The indexing and measuring conveyor means 10 is consequently arranged in the direction of conveyance F behind the transport conveyor 40, with the belt conveyor system 11 of the indexing and measuring conveyor means 10 having a conveyor belt 12 which is driven at a second conveying speed $v_2$. The second conveying speed $v_2$ is generally selected to be higher than the first conveying speed $v_1$.

During the loading of the transport conveyor 40, it can happen that packets S are placed next to one another and overlapping in the direction of conveyance F on the charging side 48 on the transport belt 43. Due to the relatively higher, second conveying speed $v_2$, the packet S which first hits the indexing and measuring conveyor means 10 on a loading side 14 is accelerated with respect to the packet S still on the upstream transport conveyor 40, so that a distance a is created between the packets S. The packets S still overlapping on the transport conveyor 40 are separated in the direction of conveyance F on the indexing and measuring conveyor means 10. A sensor 16, which is arranged above the indexing and measuring conveyor means 10 in the area of its unloading side 15, detects the packets S that pass it at the second conveying speed $v_2$ and measures each of them based on the distance a that exists between the respective packets S and assigns this measured value to the associated packet S.

The indexing and measuring conveyor means 10 is completely integrated into the frame 20, so that all components of the belt conveyor system 11 mechanically engage the frame 20 and are attached to it. In order to be able to achieve a construction of the telescopic conveyor that is as compact as possible in the direction of conveyance F, the transport conveyor 40 and the indexing and measuring conveying means 10 overlap in sections in the direction of conveyance F. A section of the transport belt 43 deflected within the frame 20 runs under the indexing and measuring conveyor means 10 and is placed on the drive station 44 under the indexing and measuring conveyor means 10. The drive station 44 of the transport conveyor 40 is thus arranged within the frame 20 and spatially below the indexing and measuring conveyor means 10, so that the installation space within the frame 20 and under the usable length $l_F$ of the transport conveyor 40 is available to accommodate the first and second telescopic segments 30, 32 in their retracted position. In this way, on the one hand, an extremely compact construction of the telescopic conveyor with retracted first and second telescopic segments 30, 32 and, on the other hand, a maximum range of the transport conveyor 40 with extended first and second telescopic segments 30, 32 can be achieved.

The transport conveyor 40 has on its delivery side 41 a height adjustment device 21 with which a vertical level h of the delivery side 41 can be changed. The height adjustment device 21 comprises a wedge 22 which rises in the direction of conveyance F and over which the transport belt 43 runs. The transport belt 43 thus follows the set inclination of the wedge 22. With the aid of the height adjustment device 21, in particular the vertical level h of the delivery side 41 can be adapted to the level of the loading side 14 of a height-adjustable indexing and measuring conveyor means 10.

FIG. 2 shows an alternative embodiment in which the indexing and measuring conveyor means 10 is not designed as a belt conveyor system 11 but as a driven roller conveyor 13. The driven roller conveyor 13 has a plurality of support rollers 17, all or more of which are set in rotation by a motor and accelerate packets S to a second conveying speed $v_2$. In this embodiment, too, sections of the transport conveyor 40 are arranged so as to overlap in the direction of conveyance F under the driven roller conveyor 13, in particular the drive station 44.

LIST OF REFERENCE NUMBERS 10 indexing and measuring conveyor means
11 belt conveyor system
12 conveyor belt
13 driven roller conveyor
14 loading side
15 unloading side
16 sensor
17 support roller
20 frame
21 height adjustment device
22 wedge
23 lifting device
24 pedestal
25 actuator
30 first telescopic segment
31 first belt loop
32 second telescopic segment
33 second belt loop
34 tensioner pulley
40 transport conveyor
41 delivery side
42 belt system
43 transport belt
44 drive station
45 motor
46 power transmission means
47 drive roller
48 charging side
a distance packets
F direction of conveyance
h vertical level
$l_{TM}$ length of indexing and measuring conveyor
$l_F$ length of transport conveyor
S packet
$v_1$ first conveying speed
$v_2$ second conveying speed
x traversing direction telescopic segments

What is claimed is:

1. A telescopic conveyor with integrated indexing and measuring conveyor means, the telescopic conveyor comprising:
    a frame,
    at least one telescopic segment mounted so as to be extendable with respect to the frame, and
    a transport conveyor, the transport conveyor is driven at a first conveying speed ($v_1$) and is supported on the at least one telescopic segment and on the frame and wherein the indexing and measuring conveyor means is arranged on a delivery side of the transport conveyor,
    wherein the indexing and measuring conveyor means is mounted on the same frame and is driven at a second conveying speed ($v_2$), the second conveying speed ($v_2$) being greater than the first conveying speed ($v_1$),
    wherein the first conveying speed ($v_1$) of the transport conveyor is 0.6 m/s to −0.8 m/s, and
    wherein the second conveying speed ($v_2$) of the indexing and measuring conveyor means is between 0.2 m/s and 0.4 m/s faster than the first conveying speed ($v_1$).

2. The telescopic conveyor according to claim 1, wherein the indexing and measuring conveyor means has a length ($l_{TM}$) of 1.20 m to 2.40 m.

3. The telescopic conveyor according to claim 1, wherein the transport conveyor and/or the indexing and measuring conveyor means is a belt conveyor system.

4. The telescopic conveyor according to claim 3, wherein each belt conveyor system has a circulating transport or conveyor belt.

5. The telescopic conveyor according to claim 4, wherein the circulating transport belt of the transport conveyor is guided at least partially under the indexing and measuring conveyor means.

6. The telescopic conveyor according to claim 5, wherein the circulating conveyor belt of the transport conveyor is driven by a drive station arranged under the indexing and measuring conveyor means.

7. The telescopic conveyor according to claim 6, wherein the drive station has a motor and/or a power transmission means and/or a drive roller.

8. The telescopic conveyor according to claim 1, wherein the indexing and measuring conveyor means is a driven roller conveyor.

9. The telescopic conveyor according to claim 1, wherein the indexing and measuring conveyor means has a loading side and an unloading side, wherein the loading side is adjoining the delivery side of the transport conveyor.

10. The telescopic conveyor according to claim 9, wherein the delivery side of the transport conveyor is arranged on the same vertical level (h) as the loading side of the indexing and measuring conveyor means.

11. The telescopic conveyor according to claim 1, wherein a sensor for detecting a packet (S) located on the indexing and measuring conveyor means is arranged above the indexing and measuring conveyor means.

12. The telescopic conveyor according to claim 1, wherein the indexing and measuring conveyor means has a length ($l_{TM}$) of 1.40 m to 2.20 m, wherein the first conveying speed ($v_1$) of the transport conveyor is 0.6 m/s to 0.8 m/s, and wherein the second conveying speed ($v_2$) of the indexing and measuring conveyor means is between 0.2 m/s and 0.4 m/s faster than the first conveying speed ($v_1$).

13. The telescopic conveyor according to claim 12, wherein the transport conveyor and/or the indexing and measuring conveyor means is a belt conveyor system, wherein each belt conveyor system has a circulating transport belt, wherein the circulating transport belt of the transport conveyor is guided at least partially under the indexing and measuring conveyor means, wherein the circulating conveyor belt of the transport conveyor is driven by a drive station arranged under the indexing and measuring conveyor means, and wherein the drive station has a motor and/or a power transmission means and/or a drive roller.

14. The telescopic conveyor according to claim 13, wherein the indexing and measuring conveyor means has a loading side and an unloading side, wherein the loading side is adjoining the delivery side of the transport conveyor, wherein the delivery side of the transport conveyor is arranged on the same vertical level (h) as the loading side of the indexing and measuring conveyor means, and wherein the delivery side of the transport conveyor is vertically adjustable with respect to the frame by means of a height adjustment device.

15. The telescopic conveyor according to claim 14, wherein the transport conveyor and/or the indexing and measuring conveyor means is a belt conveyor system, wherein each belt conveyor system has a circulating transport or conveyor belt, wherein the height adjustment device has a wedge which rises in the direction of the delivery side of the transport conveyor, and wherein the transport belt runs over the wedge, wherein a charging side of the transport conveyor is adjustable in height via a lifting device, and wherein a sensor for detecting a packet (S) located on the indexing and measuring conveyor means is arranged above the indexing and measuring conveyor means.

16. A telescopic conveyor with integrated indexing and measuring conveyor means, the telescopic conveyor comprising:
- a frame,
- at least one telescopic segment mounted so as to be extendable with respect to the frame, and
- a transport conveyor, the transport conveyor is driven at a first conveying speed ($v_1$) and is supported on the at least one telescopic segment and on the frame and wherein the indexing and measuring conveyor means is arranged on a delivery side of the transport conveyor,
- wherein the indexing and measuring conveyor means is mounted on the same frame and is driven at a second conveying speed ($v_2$), the second conveying speed ($v_2$) being greater than the first conveying speed ($v_1$), and
- wherein the delivery side of the transport conveyor is vertically adjustable with respect to the frame by means of a height adjustment device.

17. The telescopic conveyor according to claim 16, wherein the transport conveyor and/or the indexing and measuring conveyor means is a belt conveyor system, wherein each belt conveyor system has a circulating transport belt, wherein the height adjustment device has a wedge which rises in the direction of the delivery side of the transport conveyor, and wherein the transport belt runs over the wedge.

18. A telescopic conveyor with integrated indexing and measuring conveyor means, the telescopic conveyor comprising:
- a frame,
- at least one telescopic segment mounted so as to be extendable with respect to the frame, and
- a transport conveyor, the transport conveyor is driven at a first conveying speed ($v_1$) and is supported on the at least one telescopic segment and on the frame and wherein the indexing and measuring conveyor means is arranged on a delivery side of the transport conveyor,
- wherein the indexing and measuring conveyor means is mounted on the same frame and is driven at a second conveying speed ($v_2$), the second conveying speed ($v_2$) being greater than the first conveying speed ($v_1$), and
- wherein a charging side of the transport conveyor is adjustable in height via a lifting device.

19. A telescopic conveyor with integrated indexing and measuring conveyor means, the telescopic conveyor comprising:
- a frame,
- at least one telescopic segment mounted so as to be extendable with respect to the frame, and
- a transport conveyor, the transport conveyor is driven at a first conveying speed ($v_1$) and is supported on the at least one telescopic segment and on the frame and wherein the indexing and measuring conveyor means is arranged on a delivery side of the transport conveyor,
- wherein the indexing and measuring conveyor means is mounted on the same frame and is driven at a second conveying speed ($v_2$), the second conveying speed ($v_2$) being greater than the first conveying speed ($v_1$), and
- wherein a sensor for detecting a packet (S) located on the indexing and measuring conveyor means is arranged above the indexing and measuring conveyor means.

* * * * *

UNITED STATES PATENT AND TRADEMARK OFFICE
CERTIFICATE OF CORRECTION

| | |
|---|---|
| PATENT NO. | : 11,554,923 B2 |
| APPLICATION NO. | : 17/295992 |
| DATED | : January 17, 2023 |
| INVENTOR(S) | : Hansueli Christen |

It is certified that error appears in the above-identified patent and that said Letters Patent is hereby corrected as shown below:

In the Claims

In Claim 1, Line 17, replace "-0.8 m/s," with "0.8 m/s,".

Signed and Sealed this
Seventh Day of March, 2023

Katherine Kelly Vidal
*Director of the United States Patent and Trademark Office*